US008564229B2

(12) United States Patent  (10) Patent No.: US 8,564,229 B2
Imoto et al.  (45) Date of Patent: Oct. 22, 2013

(54) DEVICE AND METHOD FOR CONTROLLING MOTOR

(75) Inventors: Kazuhiro Imoto, Kariya (JP); Masahiro Matsuura, Chiryu (JP); Hiroaki Niino, Toyota (JP)

(73) Assignee: Advics Co., Ltd., Aichi-pref. (JP)

( * ) Notice: Subject to any disclaimer, the term of this patent is extended or adjusted under 35 U.S.C. 154(b) by 514 days.

(21) Appl. No.: 12/882,887

(22) Filed: Sep. 15, 2010

(65) Prior Publication Data

US 2011/0062906 A1 Mar. 17, 2011

(30) Foreign Application Priority Data

Sep. 17, 2009 (JP) .................................. 2009-215774
Aug. 31, 2010 (JP) .................................. 2010-193400

(51) Int. Cl.
*H02P 6/16* (2006.01)

(52) U.S. Cl.
USPC ............ 318/400.04; 318/400.01; 318/400.07; 318/400.38; 318/400.14; 318/721; 361/43; 388/805

(58) Field of Classification Search
USPC .......... 318/400.01, 400.14, 400.38, 721, 432, 318/400.15, 400.1, 259, 268, 652, 99, 599, 318/400.16, 400.21, 400.07, 400.34, 318/400.37, 400.4, 400.04, 799, 810, 811, 318/437; 361/23, 43; 388/805, 811

See application file for complete search history.

(56) References Cited

U.S. PATENT DOCUMENTS 6,593,714 B2 * 7/2003 Nagayama ............... 318/400.07

FOREIGN PATENT DOCUMENTS

JP   2007-151266 A    6/2007
JP   2007151266 A *   6/2007

* cited by examiner

*Primary Examiner* — Antony M Paul
(74) *Attorney, Agent, or Firm* — Sughrue Mion, PLLC

(57) ABSTRACT

A motor controlling device is provided that controls a brushless motor having a plurality of phases based on magnetic pole signals output by a plurality of magnetic pole signal output sections each corresponding to one of the phases. The motor controlling device includes an abnormality determining section, a signal generating section, and a motor controlling section. The abnormality determining section determines whether a magnetic pole signal output by each magnetic pole signal output section is an abnormal magnetic pole signal. When the abnormality determining section determines that at least one of the magnetic pole signals is an abnormal magnetic pole signal, the signal generating section generates a simulated signal corresponding to the abnormal magnetic pole signal based on the normal magnetic pole signals other than the abnormal magnetic pole signal and the rotational state of the brushless motor. The motor controlling section controls the brushless motor based on the simulated signal and the normal magnetic pole signals when the signal generating section generates the simulated signal.

14 Claims, 6 Drawing Sheets

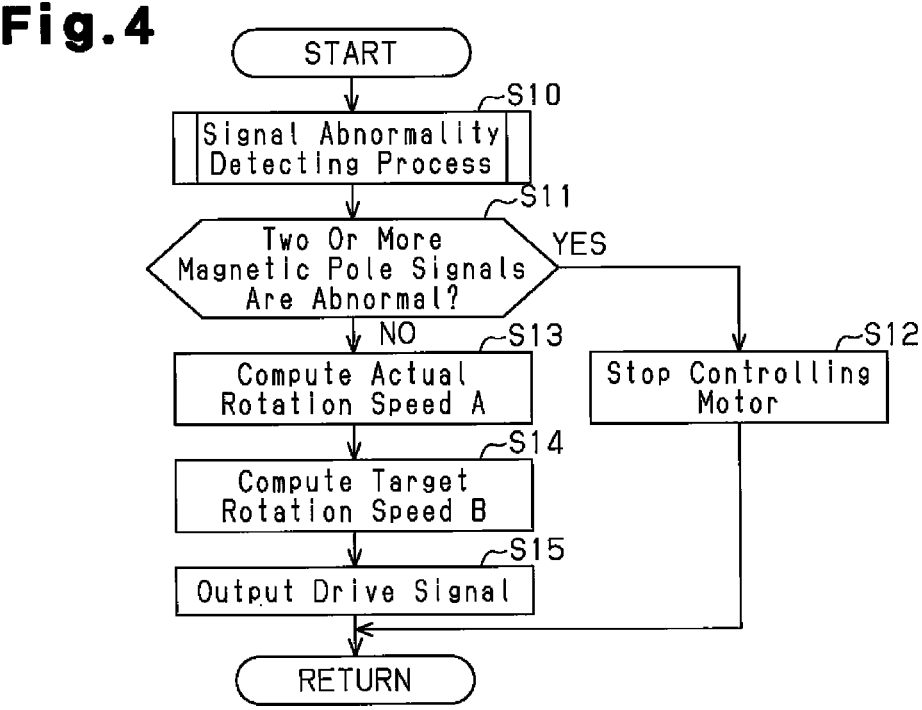
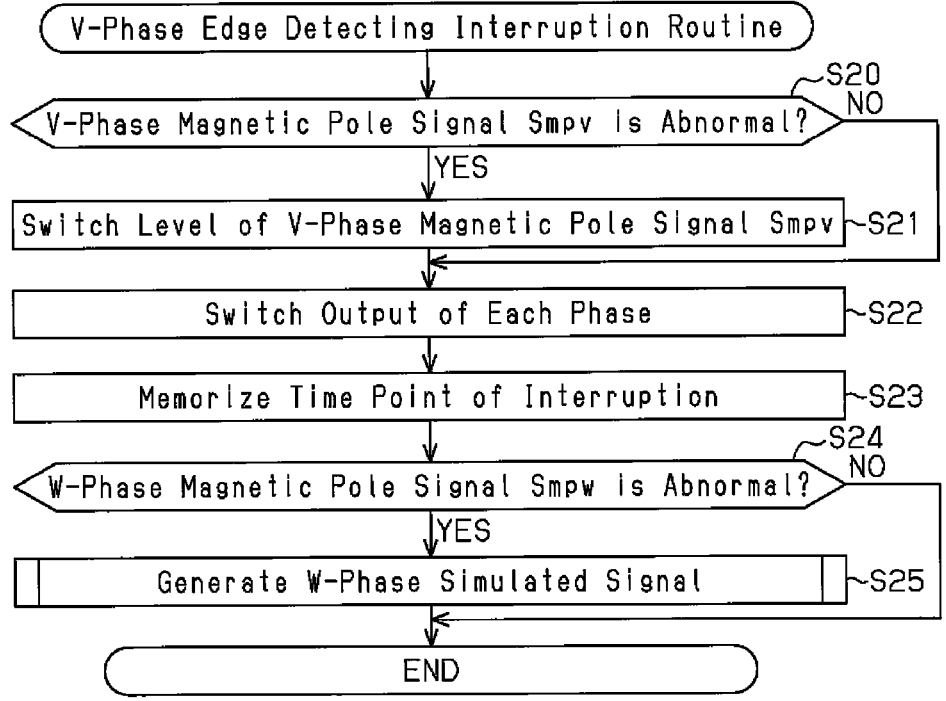

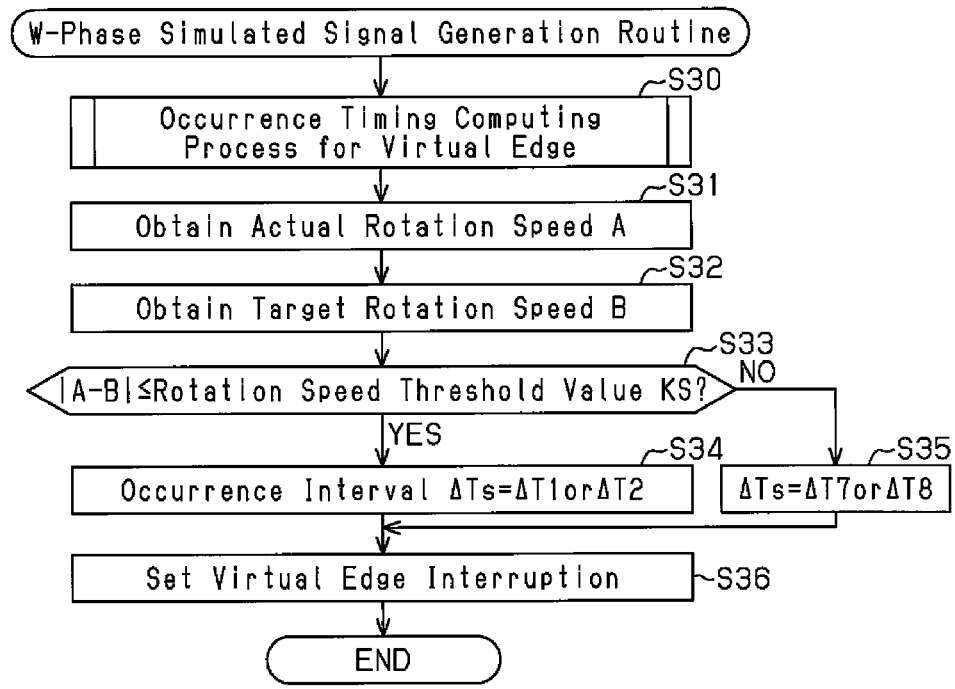
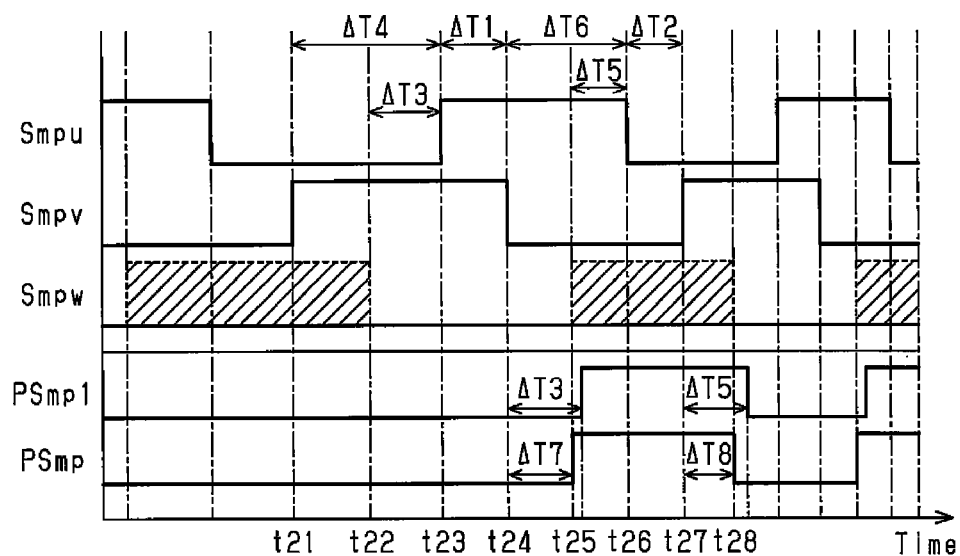

DEVICE AND METHOD FOR CONTROLLING MOTOR

BACKGROUND OF THE INVENTION

The present invention relates to a device and a method for controlling a brushless motor.

A typical brushless motor has a plurality of magnetic pole sensors, that is, magnetic pole signal output sections, each of which corresponds to one of excitation currents of multiple phases. For example, a three-phase motor includes three magnetic pole sensors respectively corresponding to U-phase, V-phase, and W-phase currents. A motor controlling device controls a brushless motor based on the timing at which rising and falling edges contained in magnetic pole signals sent from the magnetic pole sensors occur.

When there is an abnormality, for example, a breakdown, in at least one of the magnetic pole sensors, the magnetic pole signal sent from this sensor to the motor controlling device, that is, an abnormal magnetic pole signal, may include no rising edge or falling edge. In such a case, the motor controlling device may fail to properly control the brushless motor. Accordingly, different types of motor controlling devices have been recently proposed that are capable of properly controlling a brushless motor even if one of the magnetic pole sensors breaks down. For example, Japanese Laid-Open Patent Publication No. 2007-151266 describes such a motor controlling device.

When, for example, the magnetic pole sensor of the U-phase among a plurality of magnetic pole sensors breaks down, the motor controlling device of the publication temporarily stops controlling the brushless motor. Then, the rotor of the brushless motor starts coasting. During the coasting, the motor controlling device generates a simulated signal based on magnetic pole signals from the normally functioning two magnetic pole sensors (for example, the magnetic pole sensors of the V-phase and the W-phase), that is, based on normal magnetic pole signals. More specifically, the generated simulated signal includes a rising edge occurring at an intermediate timing between the rising edges contained in the two normal magnetic pole signals, and a falling edge occurring at an intermediate timing between the falling edges contained in the two normal magnetic pole signals.

If the rotation speed of the brushless motor is constant when all the magnetic pole sensors are function normally, the rising edge of the magnetic pole signal of the U-phase occurs at intermediate timing between the rising edges of the magnetic pole signals of the other two phases, and the falling edge of the magnetic pole signal of the U-phase occurs at intermediate timing between the falling edges of the magnetic pole signals of the other two phases. That is, when the rotation speed of the brushless motor is constant, a simulated signal, which is generated when the U-phase magnetic pole sensor breaks down, substantially matches with a magnetic pole signal that is output by the normally functioning U-phase magnetic pole sensor. As a result, even if one magnetic pole sensor breaks down, it is possible to properly control the brushless motor based on the simulated signal and two normal magnetic pole signals.

However, when the rotation speed of the brushless motor is not constant, that is, when the rotation of the brushless motor is accelerating or decelerating, the rising edge and the falling edge of the U-phase magnetic pole signal occur at timings different from the intermediate timing between the rising edges and intermediate timing between the falling edges of the other two phase magnetic pole signals. That is, when the rotation speed of the brushless motor is not constant, a simulated signal that is generated in the above described manner largely deviates from the original magnetic pole signal of the U-phase. Therefore, when the rotation of the brushless motor accelerates or decelerates, the brushless motor cannot be properly controlled if a simulated signal is generated.

SUMMARY OF THE INVENTION

Accordingly, it is an objective of the present invention to provide a device and method for controlling a motor that are capable of properly controlling a brushless motor even if one or more of a plurality of magnetic pole sensors become abnormal.

To achieve the foregoing objective and in accordance with a first aspect of the present invention, a motor controlling device is provided that controls a brushless motor having a plurality of phases based on magnetic pole signals output by a plurality of magnetic pole signal output sections each corresponding to one of the phases. The device includes an abnormality determining section, a signal generating section, and a motor controlling section. The abnormality determining section determines whether a magnetic pole signal output by each magnetic pole signal output section is an abnormal magnetic pole signal. When the abnormality determining section determines that at least one of the magnetic pole signals is an abnormal magnetic pole signal, the signal generating section generates a simulated signal corresponding to the abnormal magnetic pole signal based on the normal magnetic pole signals other than the abnormal magnetic pole signal and the rotational state of the brushless motor. The motor controlling section controls the brushless motor based on the simulated signal and the normal magnetic pole signals when the signal generating section generates the simulated signal.

In accordance with a second aspect of the present invention, a method for controlling a brushless motor is provided. The brushless motor has a plurality of phases based on magnetic pole signals output by a plurality of magnetic pole signal output sections each corresponding to one of the phases. The method includes: determining whether a magnetic pole signal output by each magnetic pole signal output section is an abnormal magnetic pole signal; when there is a determination that at least one of the magnetic pole signals is an abnormal magnetic pole signal, generating a simulated signal corresponding to the abnormal magnetic pole signal based on the normal magnetic pole signals other than the abnormal magnetic pole signal and the rotational state of the brushless motor; and controlling the brushless motor based on the simulated signal and the normal magnetic pole signals when the simulated signal is generated.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a flowchart showing a motor controlling process routine executed by the motor controlling section shown in FIG. 2;

FIG. 5 is a flowchart showing a V-phase edge detecting interruption routine executed by the motor controlling section shown in FIG. 2;

FIG. 6 is a flowchart showing a W-phase simulated signal generation routine of FIG. 5;

FIG. 7 is a timing chart showing changes in magnetic pole signals and simulated signals in a case where the rotation of the brushless motor accelerates;

DETAILED DESCRIPTION OF THE PREFERRED EMBODIMENTS

One embodiment of the present invention will now be described with reference to FIGS. 1 to 9. In the following description, the forward direction of the vehicle refers to the direction in which the vehicle normally advances. Also, unless otherwise specified, left and right refers to left and right in relation to the advancing direction of the vehicle.

Figure 1:
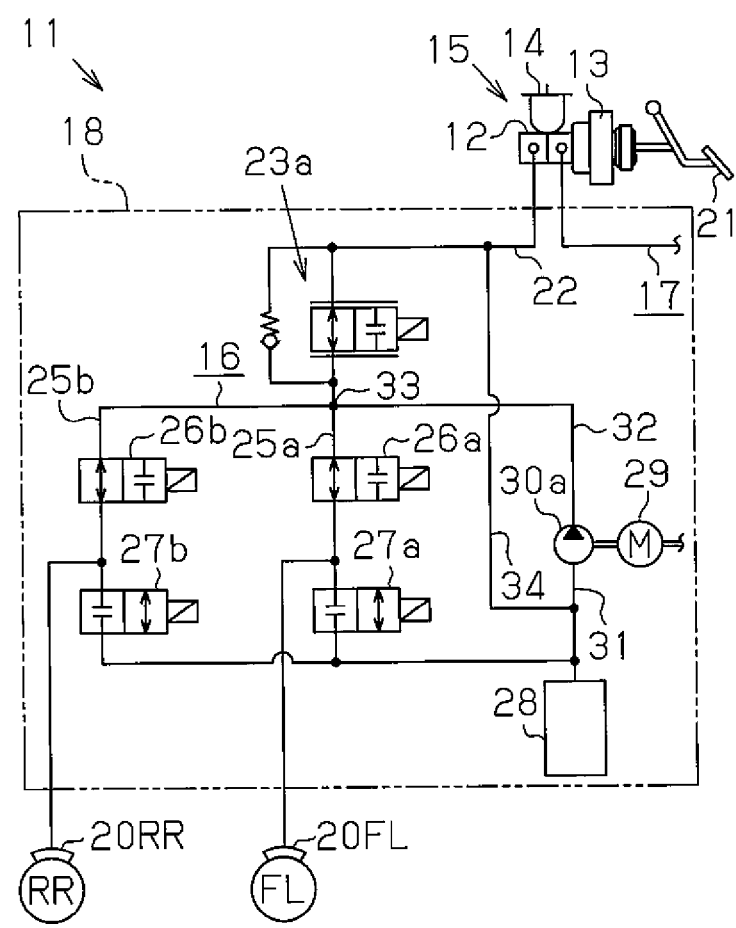
FIG. 1 is a block diagram illustrating a vehicle braking device according to one embodiment of the present invention.

In the present embodiment, the vehicle is an automobile with four wheels, specifically, right front wheel, left front wheel, right rear wheel, and left rear wheel. The vehicle is driven when the driver steps on the accelerator pedal and drive force of corresponding magnitude is transmitted to the drive wheels (for example, the rear wheels). The vehicle includes a braking device 11 for applying braking force to the wheels as shown in FIG. 1.

The braking device 11 includes a hydraulic pressure generator 15 and a brake actuator 18. The hydraulic pressure generator 15 has a master cylinder 12, a booster 13, and a reservoir 14. As shown by an alternate long and two short dashes line in FIG. 1, the brake actuator 18 includes two hydraulic circuits 16, 17. The braking device 11 further has an electronic control unit (hereinafter, also referred to as an ECU) 19 (see FIG. 2) for controlling the brake actuator 18. The hydraulic circuits 16, 17 are connected to a master cylinder 12 of a hydraulic pressure generator 15. The first hydraulic circuit 16 is connected to a wheel cylinder 20FL of the left front wheel FL and a wheel cylinder 20RR of the right rear wheel RR. The second hydraulic circuit 17 is connected to a wheel cylinder (not shown) of the right front wheel and a wheel cylinder (not shown) of the left rear wheel.

The hydraulic pressure generator 15 has a brake pedal 21. When the driver of the vehicle operates the brake pedal 21, the master cylinder 12 and the booster 13 are activated. Brake fluid is then supplied to the wheel cylinders from the master cylinder 12 through the hydraulic circuits 16, 17, so that braking force in the pressure in each wheel cylinder is applied to the corresponding wheel.

The brake actuator 18 will now be described. Since both of the hydraulic circuits 16, 17 substantially have the same configuration, only the first hydraulic circuit 16 is shown in FIG. 1, and the second hydraulic circuit 17 is omitted.

The first hydraulic circuit 16 is connected to the master cylinder 12 via a coupling passage 22 having a normally open linear electromagnetic valve 23a. The first hydraulic circuit 16 includes a left front wheel passage 25a connected to the wheel cylinder 20FL, and a right rear wheel passage 25b connected to the wheel cylinder 20RR. Booster valves 26a, 26b and decompression valves 27a, 27b are provided in the passages 25a, 25b, respectively. The booster valves 26a, 26b are normally open electromagnetic valves and are activated for limiting increase in the pressure in the wheel cylinders 20FL, 20RR, respectively. The decompression valves 27a, 27b are normally closed electromagnetic valves and are activated for lowering the pressure in the wheel cylinders 20FL, 20RR, respectively.

The first hydraulic circuit 16 is connected to a reservoir 28 and a pump 30a. The reservoir 28 temporarily retains brake fluid that has flowed out of the wheel cylinders 20FL, 20RR through the decompression valves 27a, 27b. The pump 30a is activated based on rotation of a brushless motor 29 having a plurality of phases. In the present embodiment, the brushless motor 29 has three phases, which are a U-phase, V-phase, and W-phase. The pump 30a is connected to the reservoir 28 via an inlet passage 31 and to a joint 33 between the booster valves 26a, 26b and the linear electromagnetic valve 23a via a supply passage 32. The inlet passage 31 has a branch hydraulic passage 34 branched toward the master cylinder 12. When the brushless motor 29 rotates, the pump 30a draws brake fluid from the reservoir 28 and the master cylinder 12 through the inlet passage 31 and the branch hydraulic passage 34, respectively, and discharges the brake fluid into the supply passage 32.

Figure 2:
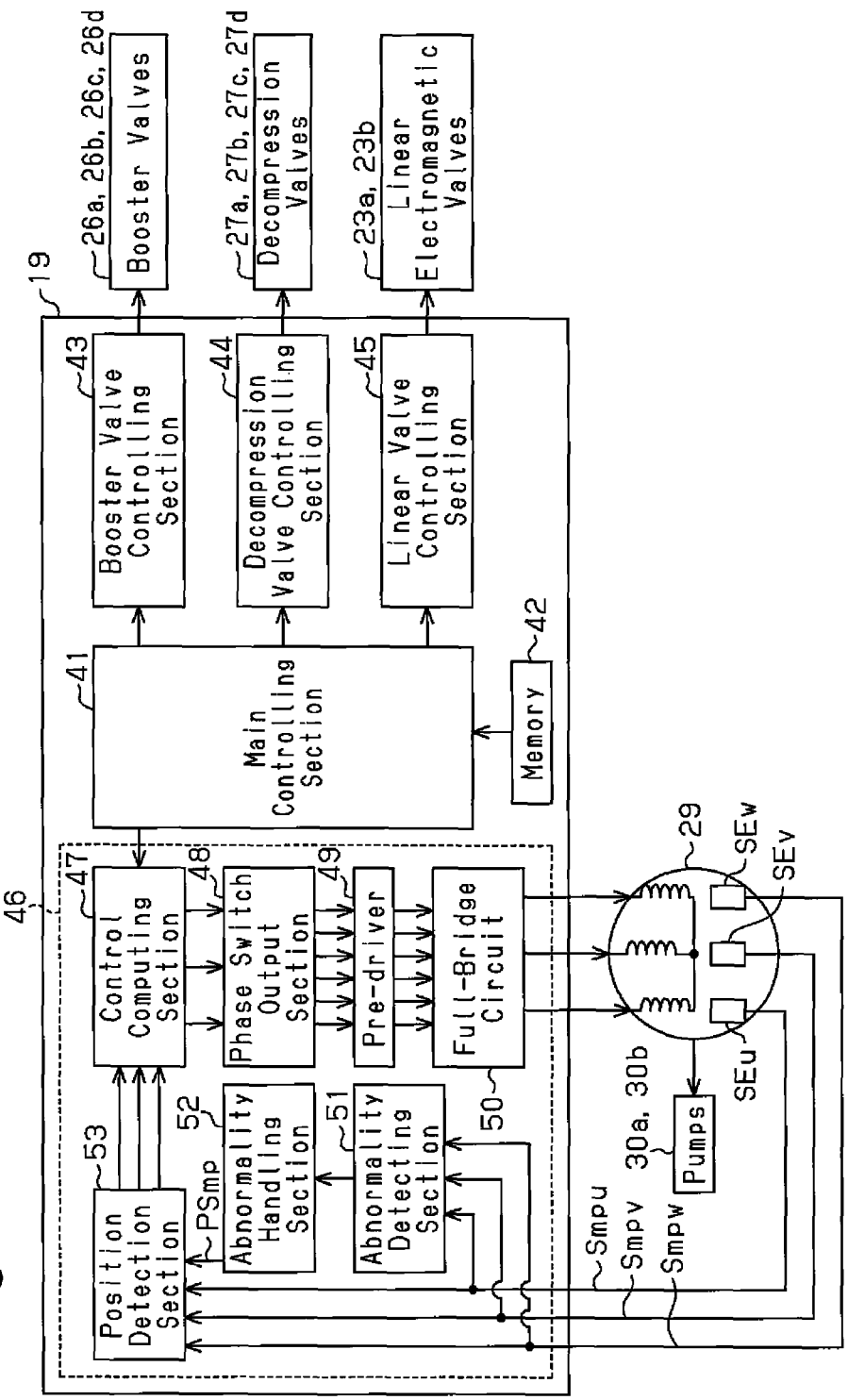
FIG. 2 is a block diagram showing an electronic control unit according to one embodiment of the present invention.
Figure 3A:
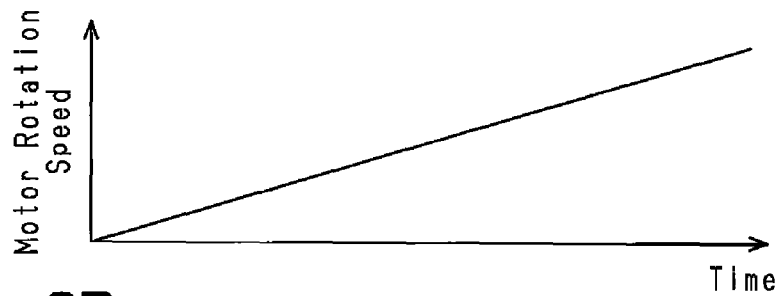
FIGS. 3A to 3D are graphs showing changes in motor rotation speed, magnetic pole signals, occurrence intervals, and edge frequencies in a case where the rotation of the brushless motor accelerates.
Figure 3B:
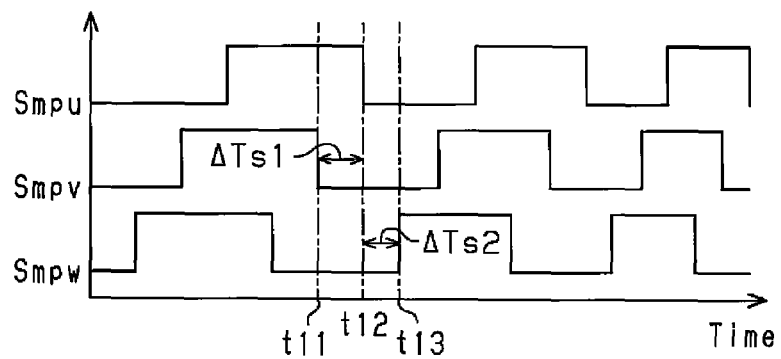
Figure 3C:
Figure 3D:
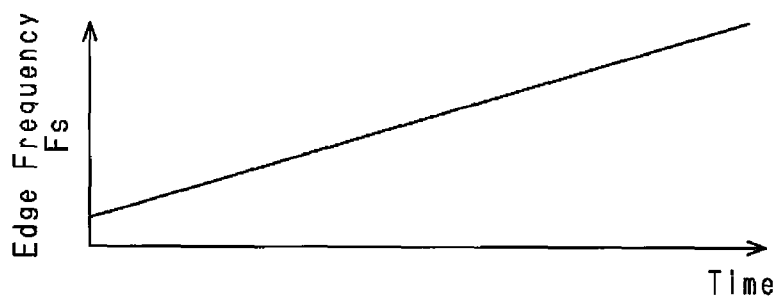

Like the first hydraulic circuit 16, the second hydraulic circuit 17 has a linear electromagnetic valve 23b, booster valves 26c, 26d, decompression valves 27c, 27d, a reservoir (not shown), and a pump 30b (see FIG. 2).

The structure of the ECU 19 will now be described with reference to FIG. 2.

As shown in FIG. 2, the ECU 19 is electrically connected to the valves 23a, 23b, 26a to 26d, and 27a to 27d, and the brushless motor 29. The ECU 19 is electrically connected to a plurality of magnetic pole sensors (that is, magnetic pole signal output sections) SEu, SEv, SEw, each corresponding to one of the phases of the brushless motor 29. The magnetic pole sensors SEu, SEv, SEw output magnetic pole signals Smpu, Smpv, Smpw having different phases, respectively. Based on detection signals from various sensors including wheel speed sensors (not shown), the ECU 19 separately controls the valves 23a, 23b, 26a to 26d, and 27a to 27d, and the brushless motor 29, thereby controlling the pumps 30a, 30b.

The ECU 19 has functioning sections formed by a digital computer having a CPU, ROM, and RAM and various driver circuits. The functioning sections include a main controlling section 41, a memory 42, a booster valve controlling section 43, a decompression valve controlling section 44, a linear valve controlling section 45, and a motor controlling section 46 serving as a motor controlling device. In FIG. 2, the motor controlling section 46 corresponds to a section encompassed by a broken line.

The main controlling section 41 is formed by, for example, a CPU. When executing various braking control procedure such as anti-lock braking control, the main controlling section 41 separately outputs command signals to the booster valve controlling section 43, the decompression valve controlling section 44, the linear valve controlling section 45, and the motor controlling section 46. The memory 42 includes a ROM and a RAM. The memory 42 stores various control procedures executed by the main controlling section 41.

The booster valve controlling section 43 is formed by hardware such as driver circuits, and separately controls the booster valves 26a to 26d based on command signals from the main controlling section 41. The decompression valve controlling section 44 is formed by hardware such as driver circuits, and separately controls the decompression valves 27a to 27d based on command signals from the main controlling section 41. The linear valve controlling section 45 is formed by hardware such as driver circuits, and separately controls the linear electromagnetic valves 23a and 23b, based on command signals from the main controlling section 41. That is, the controlling sections 43 to 45 each generate voltage signals the duty cycles of which correspond to command signals from the main controlling section 41, and separately apply the voltage signals to the valves 26a to 26d, 27a to 27d, and the brushless motor 29.

The motor controlling section 46 will now be described.

The motor controlling section 46 is formed by a CPU and hardware. The motor controlling section 46 includes a control computing section 47 that receives command signals from the main controlling section 41, a phase switch output section 48 that receives signals for each phase from the control computing section 47, a pre-driver 49 that receives signals from the phase switch output section 48, and a full-bridge circuit 50 that receives signals from the pre-driver 49. The motor controlling section 46 also includes abnormality detecting section 51 that detects abnormality in magnetic pole signals Smpu, Smpv, Smpw output by the magnetic pole sensors SEu, SEv, SEw, and an abnormality handling section 52 that generates a simulated signal that corresponds to a magnetic pole signal that has been determined to be abnormal by the abnormality detecting section 51, or an abnormal magnetic pole signal. Further, the motor controlling section 46 includes a position detection section 53 that detects the rotational position (also referred to as rotational angle) of the brushless motor 29 based on the magnetic pole signals Smpu, Smpv, Smpw.

The control computing section 47 generates drive signals for each phase based on the rotational position of the brushless motor 29 detected by the position detection section 53, and sends the drive signal to the phase switch output section 48. The phase switch output section 48 outputs to the pre-driver 49 a switching signal for switching the phase to which voltage should be applied in accordance with the rotational position of the brushless motor 29.

The pre-driver 49 and the full-bridge circuit 50 set a output signal (also referred to as an output current) corresponding to a switching signal from the phase switch output section 48 for each phase, and outputs the output signal to the brushless motor 29. The full-bridge circuit 50 has, for example, six MOS-FETs (Metal Oxide Semiconductor Field Effect Transistors), and each MOS-FET operates separately based on a switching signal from the phase switch output section 48. In the embodiment, the control computing section 47, the phase switch output section 48, the pre-driver 49, and the full-bridge circuit 50 function as a motor controlling section that controls rotation of the brushless motor 29.

Based on the magnetic pole signals Smpu, Smpv, Smpw sent from the magnetic pole sensors SEu, SEv, SEw, the abnormality detecting section 51 identifies a magnetic pole signal having an abnormality, that is, a magnetic pole sensor having an abnormality. As described in detail below, based on, for example, whether the magnetic pole signals Smpu, Smpv, Smpw contain rising edges and falling edges, the abnormality detecting section 51 identifies whether one of the magnetic pole sensors SEu, SEv, SEw is abnormal. When the magnetic pole signals Smpu, Smpv, Smpw are all normal, the abnormality detecting section 51 determines that all the magnetic pole sensors SEu, SEv, SEw are normal. In the present embodiment, the abnormality detecting section 51 functions as an edge detecting section and an abnormality determining section.

When receiving a signal indicating that one of the magnetic pole signals Smpu, Smpv, Smpw is abnormal, that is, when receiving an abnormality detection signal from the abnormality detecting section 51, the abnormality handling section 52 generates a simulated signal PSmp corresponding to the signal that has been determined to be abnormal, and sends the simulated signal to the position detection section 53. For example, when receiving an abnormality detection signal related to the W-phase magnetic pole signal Smpw, the abnormality handling section 52 outputs a simulated signal PSmp corresponding to the signal Smpw. When receiving an abnormality detection signal indicating that at least two of the magnetic pole signals Smpu, Smpv, Smpw be abnormal, the abnormality handling section 52 outputs to the main controlling section 41a signal indicating that the brushless motor 29 is out of control. In the present embodiment, the abnormality handling section 52 functions as a signal generating section.

Based on the magnetic pole signals Smpu, Smpv, Smpw sent from the magnetic pole sensors SEu, SEv, SEw, the position detection section 53 computes the rotational position of the brushless motor 29, and outputs the computation result to the control computing section 47. When one of the magnetic pole signals Smpu, Smpv, Smpw is abnormal, a simulated signal PSmp corresponding to the magnetic pole signal determined to be abnormal is sent to the position detection section 53. The position detection section 53 corrects the abnormal magnetic pole signal based on the simulated signal PSmp. Based on the corrected abnormal magnetic pole signal and the two normal magnetic pole signals, the position detection section 53 computes the rotational position of the brushless motor 29 and sends the calculation result to the control computing section 47.

Next, with reference to FIGS. 3A to 3D, the manner in which the brushless motor 29 according to the present embodiment rotates, and the relationship among the magnetic pole signals Smpu, Smpv, Smpw corresponding to each rotation manner will be described. FIGS. 3A to 3D illustrate a case in which the rotation of the brushless motor 29 accelerates.

Regarding edges contained in the three magnetic pole signals Smpu, Smpv, Smpw, occurrence interval ΔTs between edges adjacent in time change in accordance with the rotational state of the brushless motor 29, that is, acceleration, deceleration, or a constant speed. For example, as shown in FIGS. 3A to 3D, when the rotation of the brushless motor 29 is accelerating, the occurrence interval ΔTs becomes gradually shorter, and the edge frequency Fs (Fs=1/ΔTs) becomes gradually higher. That is, in FIG. 3B, a first occurrence interval ΔTs1 from first time point t11 to second time point t12 is longer than a second occurrence interval ΔTs2 from the second time point t12 to a third time point t13. At the first time point t11, a falling edge of the V-phase magnetic pole signal Smpv occurs. At the second time point t12, the immediately subsequent edge, that is, a falling edge of the U-phase magnetic pole signal Smpu occurs. At the third time point t13, the immediately subsequent edge, that is, a rising edge of W-phase magnetic pole signal Smpw occurs.

When the rotation of the brushless motor 29 is decelerating, the occurrence interval ΔTs gradually becomes longer, and the edge frequency Fs gradually becomes lower, contrary to the acceleration of the rotation of the brushless motor 29. Further, when the brushless motor 29 is rotating at a constant speed, the occurrence interval ΔTs and the edge frequency Fs are substantially constant.

A motor controlling process routine executed by the motor controlling section 46 will be described with reference to the flowchart of FIG. 4.

While the main controlling section 41 is sending to the control computing section 47 control commands to actuate the brushless motor 29, that is, the pumps 30a, 30b, the motor controlling process routine is executed at a predetermined cycle, for example, every several milliseconds. At step S10, the abnormality detecting section 51 executes a signal abnormality detecting process for detecting whether there is an abnormal signal in the magnetic pole signals Smpu, Smpv, Smpw from the magnetic pole sensors SEu, SEv, SEw. When the brushless motor 29 is rotating with all the magnetic pole signals Smpu, Smpv, Smpw being normal, each of the magnetic pole signals Smpu, Smpv, Smpw contains rising edges and falling edges (see FIG. 3B). For example, a rising edge of the W-phase magnetic pole signal Smpw occurs at a time point between a falling edge of the U-phase magnetic pole signal Smpu and a rising edge of the V-phase magnetic pole signal Smpv. A falling edge of the W-phase magnetic pole signal Smpw occurs at a time point between a rising edge of the U-phase magnetic pole signal Smpu and a falling edge of the V-phase magnetic pole signal Smpv.

When an abnormality, such as a breakdown or a short circuit, occurs in the W-phase magnetic pole sensor SEw, the W-phase magnetic pole signal Smpw no longer contains rising edges or falling edges. When the abnormality detecting section 51 does not detect edges in one of the magnetic pole signals, but detects edges in the other two magnetic pole signals, the abnormality detecting section 51 determines that the signal without edges is an abnormal magnetic pole signal. For example, when the abnormality detecting section 51 does not detect edges in the W-phase magnetic pole signal Smpw, but detects edges in the U-phase and V-phase magnetic pole signals Smpu, Smpv, the abnormality detecting section 51 determines that the W-phase magnetic pole signal Smpw is an abnormal magnetic pole signal.

Subsequently, at step S11, the abnormality handling section 52 determines whether two or more of the three magnetic pole signals Smpu, Smpv, Smpw are abnormal. When the determination result at step S11 is positive, the abnormality handling section 52 outputs to the main controlling section 41 a signal indicating that the brushless motor 29 is out of control, so that the main controlling section 41 stops controlling the brushless motor 29 (step S12). Thereafter, the motor controlling process routine is temporarily ended.

When the determination result at step S11 is negative, the actual number of rotation of the brushless motor 29 per unit time, that is, an actual rotation speed A, is computed (step S13). That is, the position detection section 53 computes the rotational position of the brushless motor 29 based on at least one of the magnetic pole signals Smpu, Smpv, Smpw, and sends a position signal corresponding to the computation result to the control computing section 47. Based on the position signal sent from the position detection section 53, the control computing section 47 computes the actual rotation speed A of the brushless motor 29. Subsequently, at step S14, the control computing section 47 computes a target number or rotation of the brushless motor 29 per unit time, or a target rotation speed B, based on a control command from the main controlling section 41. At step S15, the control computing section 47 generates a drive signal for causing the actual rotation speed A of the brushless motor 29 to approach the target rotation speed B, and controls the rotational state of the brushless motor 29 based on the generated drive signal. Thereafter, the motor controlling process routine is temporarily ended.

A V-phase edge detecting interruption routine executed by the motor controlling section 46 will now be described with reference to FIGS. 5 and 6.

The V-phase edge detecting interruption routine is executed when the motor controlling section 46 receives either a rising edge or a falling edge contained in the V-phase magnetic pole signal Smpv. In the present embodiment, when the magnetic pole signal Smpv output by the V-phase magnetic pole sensor SEv is abnormal, the motor controlling section 46 starts this routine based on an edge contained in a simulated signal PSmp, or a virtual edge. At step S20, the abnormality detecting section 51 determines whether the V-phase magnetic pole signal Smpv is abnormal. When the determination result is negative, it is determined that the V-phase magnetic pole signal Smpv is a normal magnetic pole signal (that is, not an abnormal magnetic pole signal). The process proceeds to step S22 described below.

When the determination result at step S20 is positive, the position detection section 53 switches the level of the V-phase magnetic pole signal Smpv, which is an abnormal signal, to the level of the simulated signal PSmp generated at the abnormality handling section 52. That is, when the V-phase magnetic pole signal Smpv is High, the position detection section 53 switches the V-phase magnetic pole signal Smpv to Low, thereby causing a falling edge to occur. When the V-phase magnetic pole signal Smpv is Low, the position detection section 53 switches the V-phase magnetic pole signal Smpv to High, thereby causing a rising edge to occur.

At step S22, the control computing section 47 switches the output of each phase of the brushless motor 29, that is, executes drive control of the brushless motor 29. At step S23, the control computing section 47 has the time point at which the current V-phase edge detecting interruption routine was started memorized. Subsequently, at step S24, the abnormality detecting section 51 determines whether the magnetic pole signal Smpw output by the W-phase magnetic pole sensor SEw is abnormal. If the determination result is negative, that is, if the magnetic pole signal Smpw is a normal signal, the V-phase edge detecting interruption routine is ended. If the determination result at step S24 is positive, the abnormality handling section 52 executes a process for generating a W-phase simulated signal (step S25). Thereafter, the V-phase edge detecting interruption routine is ended.

The W-phase simulated signal generation routine of step S25 will now be described with reference to the flowchart of FIG. 6 and the timing charts of FIGS. 7 to 9. The timing charts shown in FIGS. 7 to 9 correspond to a case where the W-phase magnetic pole signal Smpw is abnormal. Time points at which edges of each magnetic pole signal occur or assumed to occur are expressed by first to eighth occurrence time points t21 to t28.

At step S30, the abnormality handling section 52 executes an occurrence timing computing process for virtual edges. First, a case will be described in which timing at which a rising edge of a W-phase simulated signal PSmp is caused to occur is computed. In this case, the W-phase simulated signal generation routine is executed at time point t24, where a falling edge of the V-phase magnetic pole signal Smpv occurs, that is, at a fourth occurrence time point.

Figure 8:
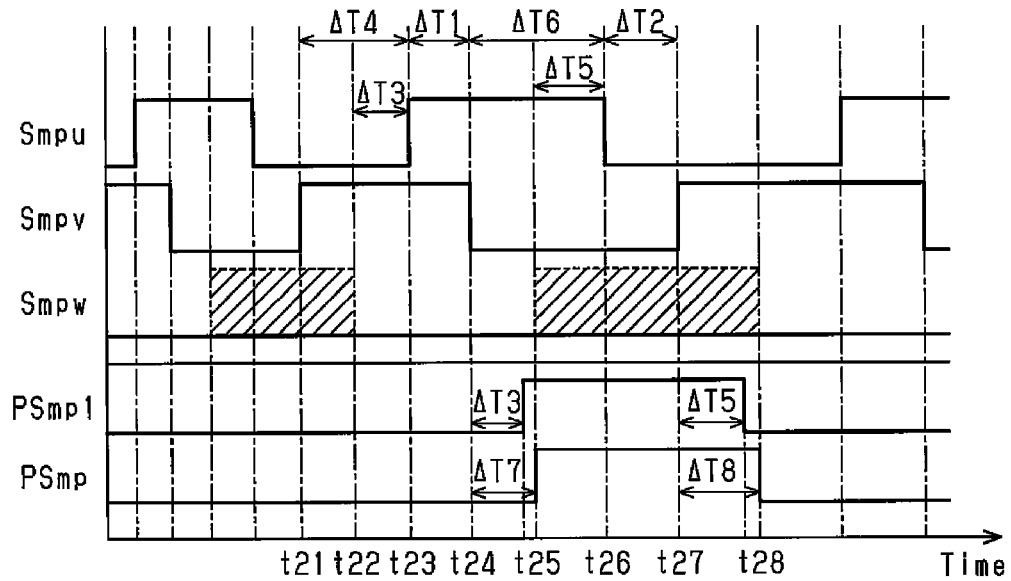
FIG. 8 is a timing chart showing changes in magnetic pole signals and simulated signals in a case where the rotation of the brushless motor decelerates.
Figure 9:
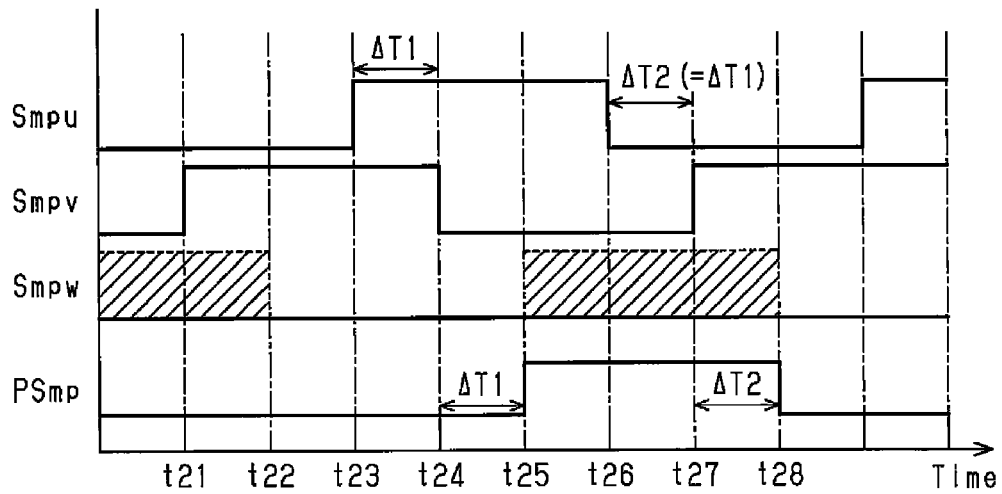
FIG. 9 is a timing chart showing changes in magnetic pole signals and simulated signals in a case where the brushless motor is rotating at a constant speed.

More specifically, as shown in FIGS. 7 and 8, the abnormality handling section 52 obtains an occurrence time point t21 of a rising edge contained in the V-phase (that is, the last phase before the W-phase in which an abnormality is detected) magnetic pole signal Smpv. The occurrence time point t21 is a first occurrence time point, which has triggered the execution of the previous V-phase edge detecting interruption routine. Also, the abnormality handling section 52 obtains an occurrence time point t23 of a rising edge contained in the U-phase (that is, the second last phase before the W-phase in which an abnormality is detected) magnetic pole signal Smpu, which rising edge has occurred after the first occurrence time point t21. That is, the abnormality handling section 52 obtains a third occurrence time point. Further, the abnormality handling section 52 obtains an occurrence time point t24 of a falling edge contained in the V-phase magnetic pole signal Smpv, which falling edge has occurred after the third occurrence time point t23. That is, the abnormality handling section 52 obtains a fourth occurrence time point. In the present embodiment, the U-phase magnetic pole signal Smpu corresponds to a first magnetic pole signal, and the V-phase magnetic pole signal Smpv corresponds to a second magnetic pole signal.

The abnormality handling section 52 computes a fourth time difference $\Delta T4$ between the first occurrence time point t21 and the third occurrence time point t23, and a first time difference $\Delta T1$ between the third occurrence time point t23 and the fourth occurrence time point t24, based on the following relational expressions (Expression 1) and (Expression 2). In the present embodiment, the fourth time difference $\Delta T4$ corresponds to a fourth time interval, and the first time difference $\Delta T1$ corresponds to a first time interval. Subsequently, the abnormality handling section 52 estimates a third time difference $\Delta T3$ between the occurrence time point t22 of the previous falling edge contained in the simulated signal PSmp, that is, the second occurrence time point, and the third occurrence time point t23 based on the following relational expression (Expression 3). In the present embodiment, the third time difference $\Delta T3$ corresponds to the third time interval.

$$\Delta T4 = T23 - t21 \quad \text{(Expression 1)}$$

$$\Delta T1 = T24 - t23 \quad \text{(Expression 2)}$$

$$\Delta T3 = \tfrac{1}{2} \times \Delta T4 \quad \text{(Expression 3)}$$

The abnormality handling section 52 computes a first frequency F1 based on the first time difference $\Delta T1$ and a third frequency F3 based on the third time difference $\Delta T3$ using the following relational expressions (Expression 4) and (Expression 5), and computes the frequency difference $\Delta F1$ of the frequencies F1 and F3 using the following relational expression (Expression 6). The frequency difference $\Delta F1$ has a positive valve when the rotation of the brushless motor 29 is accelerating, and has a negative value when the rotation of the brushless motor 29 is decelerating. Subsequently, the abnormality handling section 52 computes a frequency F7 that corresponds to the interval between the fourth occurrence time point t24 and an occurrence time point t25 of a rising edge of the simulated signal PSmp, or a fifth occurrence time point, using the following relational expression (Expression 7), and computes a seventh time difference or seventh time interval $\Delta T7$ between the fourth occurrence time point t24 and the fifth occurrence time point t25 using the following relational expression (Expression 8). In the present embodiment, the seventh time difference $\Delta T7$ corresponds to a rising edge interval, and the abnormality handling section 52 functions as a rising edge setting section.

$$F1 = 1/\Delta T1 \quad \text{(Expression 4)}$$

$$F3 = 1/\Delta T3 \quad \text{(Expression 5)}$$

$$\Delta F1 = F1 \Delta F3 \quad \text{(Expression 6)}$$

$$F7 = F1 + \Delta F1 \quad \text{(Expression 7)}$$

$$\Delta T7 = 1/F7 \quad \text{(Expression 8)}$$

Secondly, a case will be described in which timing at which a falling edge of the W-phase simulated signal PSmp is caused to occur is computed. In this case, the W-phase simulated signal generation routine is executed at time point t27, where a rising edge of the V-phase magnetic pole signal Smpv occurs, that is, at a seventh occurrence time point t27.

More specifically, the abnormality handling section 52 obtains the fourth occurrence time point t24, which has triggered the previous V-phase edge detecting interruption routine. Also, the abnormality handling section 52 obtains an occurrence time point t26 of a rising edge contained in the U-phase magnetic pole signal Smpu, which rising edge has occurred after the fourth occurrence time point t24. That is, the abnormality handling section 52 obtains a sixth occurrence time point. Further, the abnormality handling section 52 obtains an occurrence time point t27 of a rising edge contained in the V-phase magnetic pole signal Smpv, which rising edge has occurred after the sixth occurrence time point t26. That is, the abnormality handling section 52 obtains a seventh occurrence time point.

The abnormality handling section 52 computes a sixth time difference $\Delta T6$ between the fourth occurrence time point t24 and the sixth occurrence time point t26, and a second time difference $\Delta T2$ between the sixth occurrence time point t26 and the seventh occurrence time point t27, based on the following relational expressions (Expression 9) and (Expression 10). In the present embodiment, the sixth time difference $\Delta T6$ corresponds to a sixth time interval, and the second time difference $\Delta T2$ corresponds to a second time interval. Subsequently, the abnormality handling section 52 estimates a fifth time difference $\Delta T5$ between the occurrence time point t25 of the previous rising edge contained in the simulated signal PSmp, that is, the fifth occurrence time point, and the sixth occurrence time point t26, based on the following relational expression (Expression 11). In the present embodiment, the fifth time difference $\Delta T5$ corresponds to the fifth time interval.

$$\Delta T6 = T26 - t24 \quad \text{(Expression 9)}$$

$$\Delta T2 = T27 - t26 \quad \text{(Expression 10)}$$

$$\Delta T5 = \tfrac{1}{2} \times \Delta T6 \quad \text{(Expression 11)}$$

The abnormality handling section 52 computes a second frequency F2 based on the second time difference $\Delta T2$ and a fifth frequency F5 based on the fifth time difference $\Delta T5$ using the following relational expressions (Expression 12) and (Expression 13), and computes the frequency difference $\Delta F2$ of the frequencies F2 and F5 using the following relational expression (Expression 14). Subsequently, the abnormality handling section 52 computes a frequency F8 that corresponds to the interval between the seventh occurrence time point t27 and an occurrence time point t28 of a falling edge of the simulated signal PSmp, or an eighth occurrence time point, using the following relational expression (Expression 15), and computes an eighth time difference or eighth time interval $\Delta T8$ between the seventh occurrence time point t27 and the eighth occurrence time point t28 using the following relational expression (Expression 16). In the present embodiment, the eighth time difference $\Delta T8$ corresponds to a falling edge interval, and the abnormality handling section 52 functions as a falling edge setting section.

$$F2 = 1/\Delta T2 \quad \text{(Expression 12)}$$

$$F5 = 1/\Delta T5 \quad \text{(Expression 13)}$$

$$\Delta F2 = F2 - F5 \quad \text{(Expression 14)}$$

$$F8 = F2 + \Delta F2 \quad \text{(Expression 15)}$$

$$\Delta T8 = 1/F8 \quad \text{(Expression 16)}$$

The abnormality handling section 52 obtains the actual rotation speed A of the brushless motor 29 computed at step S13 (step S31), and the target rotation speed B of the brushless motor 29 computed at step S14 (step S32). Subsequently, the abnormality handling section 52 subtracts the target rotation speed B from the actual rotation speed A, and determines whether the absolute value of the subtraction is less than or equal to a predetermined rotation speed threshold value KS (step S33). The rotation speed threshold value KS is a reference value for determining whether the brushless motor 29 is rotating substantially at a constant speed, and is set in advance through experiments and simulations. In the present embodiment, the abnormality handling section 52 also functions as a rotational state determining section.

When the determination at step S33 is positive (the absolute value of A−B≤KS), the abnormality handling section 52 determines that the brushless motor 29 is rotating at a constant speed, and sets the occurrence interval ΔTs of edges as the first time difference ΔT1 or the second time difference ΔT2 (step S34). Then, the process proceeds to step S36, which will be discussed below. When the brushless motor 29 is rotating at a constant speed, the first time difference ΔT1 and the second time difference ΔT2 are substantially the same.

When the determination result at step S33 is negative (the absolute value of A−B>KS), the abnormality handling section 52 determines that the brushless motor 29 is accelerating or decelerating. The abnormality handling section 52 uses the seventh time difference ΔT7 as the occurrence interval ΔTs of edges, thereby causing a rising edge of the simulated signal PSmp to occur, and uses the eighth time difference ΔT8 as the occurrence interval ΔTs of edges, thereby causing a falling edge of the simulated signal PSmp to occur (step S35). Thereafter, the process proceeds to the subsequent step S36.

At step S36, the abnormality handling section 52 generates a virtual edge at the interruption time point memorized at step S23, that is, when the edge occurrence interval ΔTs set at step S34 or step S35 has elapsed from when the current V-phase edge detecting interruption routine has been started. That is, the abnormality handling section 52 causes a falling edge to occur when the level of the simulated signal PSmp is High, and causes a rising edge to occur when the level of the simulated signal PSmp is Low. Thereafter, the W-phase simulated signal generation routine is ended.

When the brushless motor 29 is accelerating, the intervals of occurrence of edges contained in the magnetic pole signals Smpu, Smpv, Smpw are gradually shortened as shown in FIG. 7. In a case where a simulated signal is generated using the prior art method, that is, in a case where a prior art simulated signal PSmp1 is generated, a virtual rising edge contained in the prior art simulated signal PSmp1 occurs after a time that corresponds to the third time difference ΔT3 has elapsed from the fourth occurrence time point t24. Thus, the virtual rising edge occurs at a time point delayed from the fifth occurrence time point t25, which is the time at which a rising edge contained in the W-phase magnetic pole signal Smpw should originally occur. Also, the virtual rising edge contained in the prior art simulated signal PSmp1 occurs after a predetermined time that corresponds to the fifth time difference ΔT5 from the seventh occurrence time point t27. Thus, the virtual falling edge occurs at a time point delayed from the eighth occurrence time point t28, which is the time at which a falling edge contained in the W-phase magnetic pole signal Smpw should originally occur. Even if an edge is forcibly caused to occur in the W-phase magnetic pole signal Smpw, which has been determined to be abnormal, based on the prior art simulated signal PSmp1, the obtained magnetic pole signal would be significantly different from the original W-phase magnetic pole signal Smpw. This difference becomes greater as the acceleration of the rotation of the brushless motor 29 increases. Therefore, when the brushless motor 29 is accelerating, the brushless motor 29 cannot be properly controlled based on the W-phase magnetic pole signal Smpw corrected based on the prior art simulated signal PSmp1 and the other normal magnetic pole signals Smpu and Smpv.

When the brushless motor 29 is decelerating, virtual rising edges and falling edges contained in the prior art simulated signal PSmp1 occur at an earlier timing than the rising edges and falling edges that should be contained in the W-phase magnetic pole signal Smpw as shown in FIG. 8. Thus, even if an edge is forcibly caused to occur in the W-phase magnetic pole signal Smpw, which has been determined to be abnormal, based on the prior art simulated signal PSmp1, the obtained magnetic pole signal would be significantly different from the original W-phase magnetic pole signal Smpw. This difference becomes greater as the deceleration of the rotation of the brushless motor 29 increases. Therefore, when the brushless motor 29 is decelerating, the brushless motor 29 cannot be properly controlled based on the corrected W-phase magnetic pole signal Smpw based on the prior art simulated signal PSmp1 and the other normal magnetic pole signals Smpu and Smpv.

In this regard, according to the present embodiment, even if the brushless motor 29 is accelerating or decelerating, virtual rising edges contained in the simulated signal PSmp occur at a timing that is significantly close to the original timing at which the rising edge that should be contained in the W-phase magnetic pole signal Smpw, compared to the prior art case. Also, virtual falling edges contained in the simulated signal PSmp occur at timing that is significantly close to the original timing at which the falling edge that should be contained in the W-phase magnetic pole signal Smpw, compared to the prior art case. Thus, if an edge is forcibly caused to occur in the W-phase magnetic pole signal Smpw, which has been determined to be abnormal, based on the simulated signal PSmp, the obtained magnetic pole signal is significantly close to the original W-phase magnetic pole signal Smpw. Therefore, even if the brushless motor 29 is accelerating or decelerating, when there is an abnormality only in one of the magnetic pole signals, the brushless motor 29 can be properly controlled based on the W-phase magnetic pole signal Smpw corrected based on the simulated signal PSmp and the other normal magnetic pole signals Smpu and Smpv.

When receiving a rising edge or a falling edge contained in the U-phase magnetic pole signal Smpu, the motor controlling section 46 of the present embodiment executes a U-phase edge detecting interruption routine, which corresponds to the V-phase edge detecting interruption routine. At this time, if only the V-phase magnetic pole signal Smpv is abnormal among the magnetic pole signals Smpu, Smpv, Smpw, the abnormality handling section 52 executes a V-phase simulated signal generation routine, which corresponds to the W-phase simulated signal generation routine. As a result, a simulated signal PSmp that corresponds to the rotational state of the brushless motor 29 is generated. The brushless motor 29 is controlled based on the V-phase magnetic pole signal Smpv, which has been corrected based on the simulated signal, and the other normal magnetic pole signals Smpu, Smpw. Therefore, even if the brushless motor 29 is accelerating or decelerating, when only the V-phase magnetic pole signal Smpv is abnormal, the brushless motor 29 is properly controlled by the motor controlling section 46. In this case, the W-phase magnetic pole signal Smpw corresponds to a first magnetic pole signal, and the U-phase magnetic pole signal Smpu corresponds to a second magnetic pole signal.

When receiving a rising edge or a falling edge contained in the W-phase magnetic pole signal Smpw, the motor controlling section 46 of the present embodiment executes a W-phase edge detecting interruption routine, which corresponds to the V-phase edge detecting interruption routine. At this time, if only the U-phase magnetic pole signal Smpu is abnormal among the magnetic pole signals Smpu, Smpv, Smpw, the abnormality handling section 52 executes a U-phase simulated signal generation routine, which corresponds to the W-phase simulated signal generation routine. As a result, a simulated signal PSmp that corresponds to the rotational state of the brushless motor 29 is generated. The brushless motor 29 is controlled based on the U-phase magnetic pole signal Smpu, which has been corrected based on the simulated signal, and the other normal magnetic pole signals Smpv, Smpw. Therefore, even if the brushless motor 29 is accelerating or decelerating, when only the U-phase magnetic pole signal Smpu is abnormal, the brushless motor 29 is properly controlled by the motor controlling section 46. In this case, the V-phase magnetic pole signal Smpv corresponds to a first magnetic pole signal, and the W-phase magnetic pole signal Smpw corresponds to a second magnetic pole signal.

The present embodiment has the following advantages.

(1) The simulated signal PSmp is generated in accordance with the rotational state of the brushless motor 29, that is, whether the brushless motor 29 is rotating at a constant speed, accelerating, or decelerating, based on the normal magnetic pole signals, which are, for example, the U-phase and V-phase magnetic pole signals Smpu, Smpv. Thus, compared to the prior art case where a simulated signal, or the prior art simulated signal PSmp1, is generated without taking the rotational state of the brushless motor 29 into consideration, the simulated signal PSmp can be made close to an original magnetic pole signal, which is, for example, the W-phase magnetic pole signal Smpw. Therefore, even if one or more of the magnetic pole sensors SEu, SEv, SEw, for example, the W-phase magnetic pole sensor SEw outputs an abnormal magnetic pole signal, the simulated signal PSmp is properly generated and the brushless motor 29 is properly controlled.

(2) In general, when the brushless motor 29 is accelerating, intervals of the occurrences of edges contained in the magnetic pole signals Smpu, Smpv, Smpw gradually become shorter. That is, the intervals of edges adjacent in time tend to be shortened. In the present embodiment, the simulated signal PSmp is generated such that the interval between edges contained in the simulated signal PSmp and a normal magnetic pole signal, for example, the U-phase or V-phase magnetic pole signal Smpu, Smpv gradually become shorter. Therefore, the simulated signal PSmp can be brought closer to the original magnetic pole signal, for example, the W-phase magnetic pole signal Smpw. This allows the acceleration of the rotation of the brushless motor 29 to be more accurately controlled.

(3) When the brushless motor 29 is decelerating, intervals of the occurrences of edges contained in the magnetic pole signals Smpu, Smpv, Smpw gradually become longer. That is, the intervals of edges adjacent in time tend to be widened. In the present embodiment, the simulated signal PSmp is generated such that the interval between edges contained in the simulated signal PSmp and a normal magnetic pole signal, for example, the U-phase or V-phase magnetic pole signal Smpu, Smpv gradually become longer. Therefore, the simulated signal PSmp can be brought closer to the original magnetic pole signal, for example, the W-phase magnetic pole signal Smpw. This allows the deceleration of the rotation of the brushless motor 29 to be more accurately controlled.

(4) When the brushless motor 29 is accelerating, the first time difference $\Delta T1$ becomes shorter than the third time difference $\Delta T3$. In contrast, when the brushless motor 29 is decelerating, the first time difference $\Delta T1$ becomes longer than the third time difference $\Delta T3$. The seventh time difference $\Delta T7$, which is the time difference from when a falling edge of the first magnetic pole signal occurs to when a virtual rising edge of the simulated signal PSmp occurs is set in accordance with the difference between the first time difference $\Delta T1$ and the third time difference $\Delta T3$. Therefore, a rising edge of the simulated signal PSmp is allowed to occur at a timing closer to that of the original rising of the magnetic pole signal.

(5) The third time difference $\Delta T3$ is computed based on the above relational expression (Expression 3). Therefore, before one magnetic pole signal, for example, the W-phase magnetic pole signal Smpw is determined to be abnormal, and the simulated signal PSmp has yet to be generated at the second occurrence time point t22, the third time difference $\Delta T3$ can be reliably estimated based on the two normal magnetic pole signals, which are, for example, the U-phase and V-phase magnetic pole signals Smpu, Smpv.

(6) When the brushless motor 29 is accelerating, the second time difference $\Delta T2$ becomes shorter than the fifth time difference $\Delta T5$. In contrast, when the brushless motor 29 is decelerating, the second time difference $\Delta T2$ becomes longer than the fifth time difference $\Delta T5$. The eighth time difference $\Delta T8$, which is a time difference from when a rising edge of the first magnetic pole signal occurs to when a virtual falling edge of the simulated signal PSmp occurs is set in accordance with the difference between the second time difference $\Delta T2$ and the fifth time difference $\Delta T5$. Therefore, a falling edge of the simulated signal PSmp is allowed to occur at timing closer to that of the original falling edge of the magnetic pole signal.

(7) The fifth time difference $\Delta T5$ is computed based on the above relational expression (Expression 11). Therefore, before one magnetic pole signal, for example, the W-phase magnetic pole signal Smpw is determined to be abnormal, and the simulated signal PSmp has yet to be generated at the fifth occurrence time point t25, the fifth time difference $\Delta T5$ can be reliably estimated based on the two normal magnetic pole signals, which are, for example, the U-phase and V-phase magnetic pole signals Smpu, Smpv.

(8) In the present embodiment, when the brushless motor 29 is accelerating or decelerating, the simulated signal PSmp is generated by taking the rotational state of the brushless motor 29 into consideration in addition to other factors. In contrast, when the brushless motor 29 is rotating at a constant speed, the simulated signal PSmp is generated by the prior art method, without taking the rotational state of the brushless motor 29 into consideration. Thus, when the brushless motor is rotating at a constant speed, a virtual rising edge of the simulated signal PSmp can be made to occur at the intermediate timing between rising edges of the two normal magnetic pole signals. Likewise, a virtual falling edge of the simulated signal PSmp can be made to occur at the intermediate timing between falling edges of the two normal magnetic pole signals. Therefore, when the brushless motor 29 is rotating at a constant speed, the simulated signal PSmp can be generated by a simple computation method.

(9) In some cases, the rotation speed of the brushless motor 29 mounted on the brake actuator 18 is adjusted as necessary even when a braking operation, for example, anti-lock braking operation is being executed. That is, the brushless motor 29 is often either accelerating or decelerating. Therefore, even if one magnetic pole signal is abnormal, a simulated signal is generated by the above described method so that acceleration or deceleration of the rotation of the brushless motor 29 of the brake actuator 18 is reliably controlled.

The above described embodiment may be modified according to the following further embodiments.

In the W-phase simulated signal generating process, the V-phase simulated signal generating process, and the U-phase simulated signal generating process, steps S33 and S34 and procedures corresponding to steps S33 and S34 may be omitted. That is, regardless of whether the brushless motor 29 is rotating at a constant speed, the seventh time difference ΔT7 may be used as the occurrence interval ΔTs of edges, thereby causing a rising edge of the simulated signal PSmp to occur, and the eighth time difference ΔT8 may be used as the occurrence interval ΔTs of edges, thereby causing a falling edge of the simulated signal PSmp to occur. In this configuration, the simulated signal PSmp at a constant speed state can be accurately generated.

Whether there is an abnormality in each of the magnetic pole signals Smpu, Smpv, Smpw may be determined at an arbitrary point in time. For example, when the brushless motor 29 is activated as an initial operation immediately after the ignition switch (not shown) of the vehicle is turned on, it is possible to determine whether there is an abnormal magnetic pole signal based on the magnetic pole signals Smpu, Smpv, Smpw from the magnetic pole sensors SEu, SEv, SEw. When a braking operation is executed in which the brushless motor 29 is activated while the vehicle is traveling, it is also possible to determine whether there is an abnormal magnetic pole signal based on the magnetic pole signals Smpu, Smpv, Smpw from the magnetic pole sensors SEu, SEv, SEw. Further, when the brushless motor 29 is activated while the vehicle is traveling without operating the brake pedal or control for braking, it is possible to determine whether there is an abnormal magnetic pole signal based on the magnetic pole signals Smpu, Smpv, Smpw from the magnetic pole sensors SEu, SEv, SEw.

When calculating the frequencies F1, F3, F2, F5, the computation results of the relational expressions (Expression 4) (Expression 5) (Expression 12) (Expression 13) may be multiplied by a gain that corresponds to the rotational state of the brushless motor 29.

Acceleration or deceleration of the rotation of the brushless motor 29 may be calculated, and the seventh time difference ΔT7 may be computed by subtracting from or adding to the first time difference ΔT1 a change of the edge occurrence interval calculated based on the calculated acceleration or deceleration. Likewise, the eighth time difference ΔT8 may be computed by subtracting from or adding to the second time difference ΔT2 a change of the edge occurrence interval calculated based on the calculated acceleration or deceleration of the rotation of the brushless motor 29.

In the illustrated embodiment, the brushless motor 29 cannot be controlled when two of the magnetic pole signals are abnormal. However, simulated signals that correspond to two magnetic pole signals determined to be abnormal may be generated based on the other normal magnetic pole signal. That is, if one of the magnetic pole signals is normal, it is possible to detect the rotational state of the brushless motor 29. Also, when the brushless motor 29 is accelerating, the acceleration can be detected. Likewise, when the brushless motor 29 is decelerating, the deceleration can be detected. In this manner, two simulated signals can be generated by taking the rotational state of the brushless motor 29 into consideration. This allows the brushless motor 29 to be reliably controlled even if two of the magnetic pole signals are abnormal.

The motor controlling device according to the present invention may be embodied as a controlling device having multiple phases other than three phases, for example, six phases. That is, when one or more of the six phases are abnormal, simulated signals corresponding to the magnetic pole signals of the abnormal phases may be generated based on the other normal magnetic pole signals.

The motor controlling device of the present invention may be employed in any brushless motor mounted on a vehicle. For example, the motor controlling device may be used to control a brushless motor serving as a drive source of a wiper. Also, the motor controlling device of the present invention may be employed in any brushless motor mounted on any electric device other than vehicles. For example, the motor controlling device may be used to control a brushless motor serving as a drive source for a washing machine.

What is claimed is:

1. A motor controlling device for controlling a brushless motor having a plurality of phases based on magnetic pole signals output by a plurality of magnetic pole signal output sections each corresponding to one of the phases, the device comprising:

an abnormality determining section that determines whether a magnetic pole signal output by each magnetic pole signal output section is an abnormal magnetic pole signal;

a signal generating section, wherein when the abnormality determining section determines that at least one of the magnetic pole signals is an abnormal magnetic pole signal, the signal generating section generates a simulated signal corresponding to the abnormal magnetic pole signal based on the normal magnetic pole signals other than the abnormal magnetic pole signal and the rotational state of the brushless motor;

a motor controlling section that controls the brushless motor based on the simulated signal and the normal magnetic pole signals when the signal generating section generates the simulated signal; and an edge detecting section for detecting rising edges and falling edges of each magnetic pole signal, the brushless motor having three phases, wherein, when the abnormality determining section determines that one of the three magnetic pole signals is an abnormal magnetic pole signal while the rotation of the brushless motor is accelerating, the signal generating section:

sets a time point at which a rising edge of the simulated signal occurs such that a rising edge interval is shorter than a first time interval, the first time interval being a period from when a rising edge of a first magnetic pole signal of the normal magnetic pole signals occurs to when a falling edge of a second magnetic pole signal of the normal magnetic pole signal occurs, and the rising edge interval being a period from when a falling edge of the second magnetic pole signal occurs to when a rising edge of the simulated signal occurs, and sets a time point at which a falling edge of the simulated signal occurs such that a falling edge interval is shorter than a second time interval, the second time interval being a period from when a falling edge of the first magnetic pole signal occurs to when a rising edge of the second magnetic pole signal occurs, and the falling edge interval being a period from when a rising edge of the second magnetic pole signal occurs to when a falling edge of the simulated signal occurs.

2. The motor controlling device according to claim 1, further comprising a rising edge setting section, wherein, when the abnormality determining section determines that one of the three magnetic pole signals is an abnormal magnetic pole signal, the rising edge setting section sets the rising edge interval based on the difference between the first time interval and a third time interval, the third time interval being a period from when the previous falling edge of the simulated signal occurs to when a rising edge of the first magnetic pole signal occurs, and wherein the signal generating section sets a time point at which a rising edge of the simulated signal occurs based on the rising edge interval set by the rising edge setting section.

3. The motor controlling device according to claim 2, wherein the rising edge setting section estimates the third time interval based on a fourth time interval, the fourth time interval being a period between a rising edge of the second magnetic pole signal that has occurred prior to the previous falling edge of the simulated signal and a rising edge of the first magnetic pole signal that has occurred after the previous falling edge of the simulated signal.

4. The motor controlling device according to claim 2, wherein the rising edge setting section subtracts a frequency based on the third time interval from a frequency based on the first time interval, adds the frequency based on the first time interval to the subtraction result, and sets the rising edge interval based on the addition result.

5. The motor controlling device according to claim 1, further comprising a falling edge setting section, wherein, when the abnormality determining section determines that one of the three magnetic pole signals is an abnormal magnetic pole signal, the falling edge setting section sets the falling edge interval based on the difference between the second time interval and a fifth time interval, the fifth time interval being a period from when the previous rising edge of the simulated signal occurs to when a falling edge of the first magnetic pole signal occurs, and wherein the signal generating section sets a time point at which a falling edge of the simulated signal occurs based on the falling edge interval set by the falling edge setting section.

6. The motor controlling device according to claim 5, wherein the falling edge setting section estimates the fifth time interval based on a sixth time interval, the sixth time interval being a period between a falling edge of the second magnetic pole signal that has occurred prior to the previous rising edge of the simulated signal and a falling edge of the first magnetic pole signal that has occurred after the previous rising edge of the simulated signal.

7. The motor controlling device according to claim 5, wherein the falling edge setting section subtracts a frequency based on the fifth time interval from a frequency based on the second time interval, adds the frequency based on the second time interval to the subtraction result, and sets the falling edge interval based on the addition result.

8. A motor controlling device for controlling a brushless motor having a plurality of phases based on magnetic pole signals output by a plurality of magnetic pole signal output sections each corresponding to one of the phases, the device comprising:

an abnormality determining section that determines whether a magnetic pole signal output by each magnetic pole signal output section is an abnormal magnetic pole signal;

a signal generating section, wherein when the abnormality determining section determines that at least one of the magnetic pole signals is an abnormal magnetic pole signal, the signal generating section generates a simulated signal corresponding to the abnormal magnetic pole signal based on the normal magnetic pole signals other than the abnormal magnetic pole signal and the rotational state of the brushless motor;

a motor controlling section that controls the brushless motor based on the simulated signal and the normal magnetic pole signals when the signal generating section generates the simulated signal; and an edge detecting section for detecting rising edges and falling edges of each magnetic pole signal, the brushless motor having three phases, wherein, when the abnormality determining section determines that one of the three magnetic pole signals is an abnormal magnetic pole signal while the rotation of the brushless motor is decelerating, the signal generating section:

sets a time point at which a rising edge of the simulated signal occurs such that a rising edge interval is longer than a first time interval, the first time interval being a period from when a rising edge of a first magnetic pole signal of the normal magnetic pole signals occurs to when a falling edge of a second magnetic pole signal of the normal magnetic pole signal occurs, and the rising edge interval being a period from when a falling edge of the second magnetic pole signal occurs to when a rising edge of the simulated signal occurs, and sets a time point at which a falling edge of the simulated signal occurs such that a falling edge interval is longer than a second time interval, the second time interval being a period from when a falling edge of the first magnetic pole signal occurs to when a rising edge of the second magnetic pole signal occurs, and the falling edge interval being a period from when a rising edge of the second magnetic pole signal occurs to when a falling edge of the simulated signal occurs.

9. The motor controlling device according to claim 8, further comprising a rising edge setting section, wherein, when the abnormality determining section determines that one of the three magnetic pole signals is an abnormal magnetic pole signal, the rising edge setting section sets the rising edge interval based on the difference between the first time interval and a third time interval, the third time interval being a period from when the previous falling edge of the simulated signal occurs to when a rising edge of the first magnetic pole signal occurs, and wherein the signal generating section sets a time point at which a rising edge of the simulated signal occurs based on the rising edge interval set by the rising edge setting section.

10. The motor controlling device according to claim 9, wherein the rising edge setting section estimates the third time interval based on a fourth time interval, the fourth time interval being a period between a rising edge of the second magnetic pole signal that has occurred prior to the previous falling edge of the simulated signal and a rising edge of the first magnetic pole signal that has occurred after the previous falling edge of the simulated signal.

11. The motor controlling device according to claim 9, wherein the rising edge setting section subtracts a frequency based on the third time interval from a frequency based on the first time interval, adds the frequency based on the first time interval to the subtraction result, and sets the rising edge interval based on the addition result.

12. The motor controlling device according to claim 8, further comprising a falling edge setting section, wherein, when the abnormality determining section determines that one of the three magnetic pole signals is an abnormal magnetic pole signal, the falling edge setting section sets the falling edge interval based on the difference between the second time interval and a fifth time interval, the fifth time interval being a period from when the previous rising edge of the simulated signal occurs to when a falling edge of the first magnetic pole signal occurs, and wherein the signal generating section sets a time point at which a falling edge of the simulated signal occurs based on the falling edge interval set by the falling edge setting section.

13. The motor controlling device according to claim 12, wherein the falling edge setting section estimates the fifth time interval based on a sixth time interval, the sixth time interval being a period between a falling edge of the second magnetic pole signal that has occurred prior to the previous rising edge of the simulated signal and a falling edge of the first magnetic pole signal that has occurred after the previous rising edge of the simulated signal.

14. The motor controlling device according to claim 12, wherein the falling edge setting section subtracts a frequency based on the fifth time interval from a frequency based on the second time interval, adds the frequency based on the second time interval to the subtraction result, and sets the falling edge interval based on the addition result.

\* \* \* \* \*